(12) United States Patent
Coffee

(10) Patent No.: US 7,388,699 B1
(45) Date of Patent: Jun. 17, 2008

(54) MUSICAL LASER DISPLAY DEVICE

(76) Inventor: Curtis L. Coffee, 202 W. 44th St., Indianapolis, IN (US) 46204

( * ) Notice: Subject to any disclaimer, the term of this patent is extended or adjusted under 35 U.S.C. 154(b) by 154 days.

(21) Appl. No.: 11/484,477

(22) Filed: Jul. 11, 2006

Related U.S. Application Data

(60) Provisional application No. 60/698,158, filed on Jul. 11, 2005.

(51) Int. Cl.
*G02B 26/08* (2006.01)
(52) U.S. Cl. ..................................... 359/212
(58) Field of Classification Search ......... 359/212–214
See application file for complete search history.

(56) References Cited

U.S. PATENT DOCUMENTS

| | | |
|---|---|---|
| 2,971,054 A | 2/1961 | Holt |
| 3,436,139 A | 4/1969 | Barkow |
| 3,521,191 A | 7/1970 | Golden et al. |
| 3,532,408 A | 10/1970 | Dostal |
| 3,590,681 A | 7/1971 | Cross |
| 3,603,195 A | 9/1971 | Williams |
| 3,892,478 A | 7/1975 | Lampkin |
| 3,999,833 A | 12/1976 | Reich et al. |
| 4,010,361 A | 3/1977 | Latterman et al. |
| 4,196,461 A | 4/1980 | Geary |
| 4,205,585 A | 6/1980 | Hornick |
| 4,298,868 A | 11/1981 | Spurgeon |
| 4,327,975 A | 5/1982 | Harris |
| 4,421,381 A | 12/1983 | Ueda et al. |
| 4,502,752 A | 3/1985 | Montagu |
| 4,732,440 A | 3/1988 | Gadhok |
| 4,814,800 A | 3/1989 | Lavinsky et al. |
| 4,850,687 A | 7/1989 | Reis et al. |
| 4,887,197 A | 12/1989 | Effinger |
| 4,923,263 A | 5/1990 | Johnson |
| 4,990,808 A | 2/1991 | Paulsen |
| 5,050,056 A | 9/1991 | Ellison |
| 5,130,838 A | 7/1992 | Tanaka et al. |
| 5,168,149 A | 12/1992 | Dvorkis et al. |
| 5,486,944 A | 1/1996 | Bard et al. |
| 5,543,956 A | 8/1996 | Nakagawa et al. |
| 5,559,319 A | 9/1996 | Peng |
| 5,610,752 A | 3/1997 | Hayakawa |
| 5,825,013 A | 10/1998 | Dvorkis et al. |
| 5,870,219 A | 2/1999 | Plesko |
| 5,982,521 A | 11/1999 | Bessho et al. |
| 6,142,653 A | 11/2000 | Larson |
| 6,233,086 B1 | 5/2001 | Hardiman |
| 7,064,879 B1 | 6/2006 | Levitan et al. |
| 2004/0190097 A1 | 9/2004 | Shpizel et al. |

*Primary Examiner*—Euncha P. Cherry
(74) *Attorney, Agent, or Firm*—P. Derek Pressley; William F. Bahret

(57) ABSTRACT

A device for deflecting a light beam in response to an audio input signal includes a hub member, a mirror flexibly attached to the hub member, a magnet connected to the mirror, an electromagnetic coil, and a low pass filter. The electromagnetic coil is positioned adjacent the magnet for producing an electromagnetic field in relation to a received audio input signal when energized, thereby urging the magnet and the mirror to oscillate with respect to the hub member in relation to the audio input signal. The low pass filter filters out audio input signal frequencies that would cause the mirror and the magnet to naturally resonate. The mirror may be attached at an offset angle that causes a light beam striking the mirror to be deflected angularly away from an axis of rotation passing through the hub member.

8 Claims, 6 Drawing Sheets

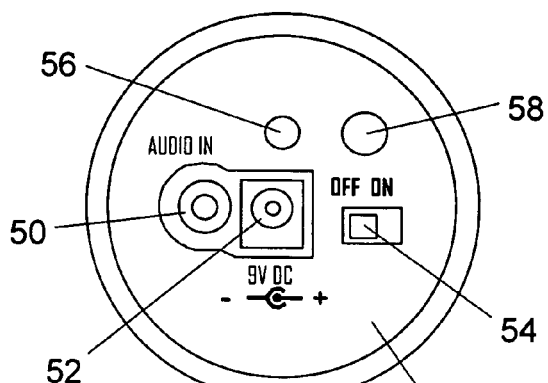
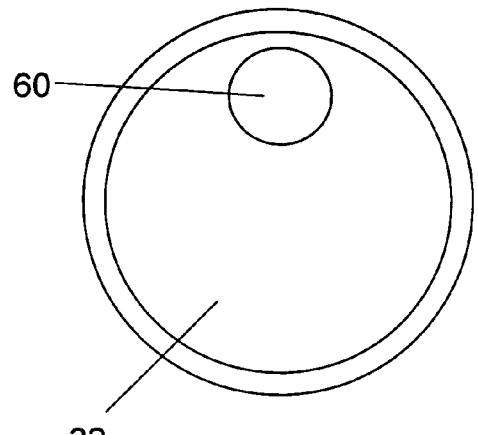
FIG. 3
FIG. 4
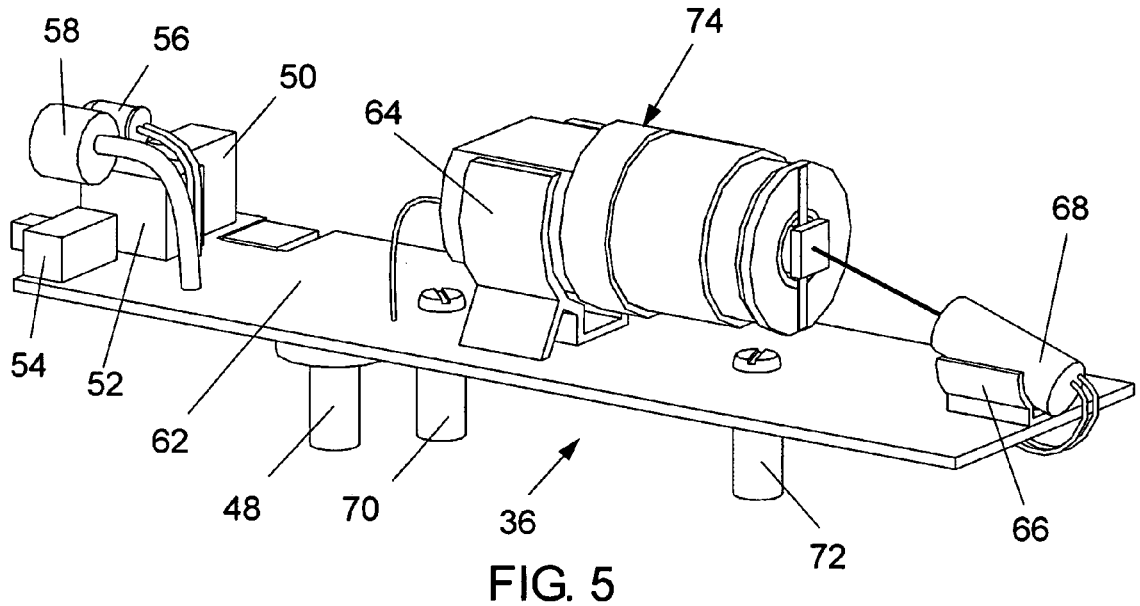
FIG. 5
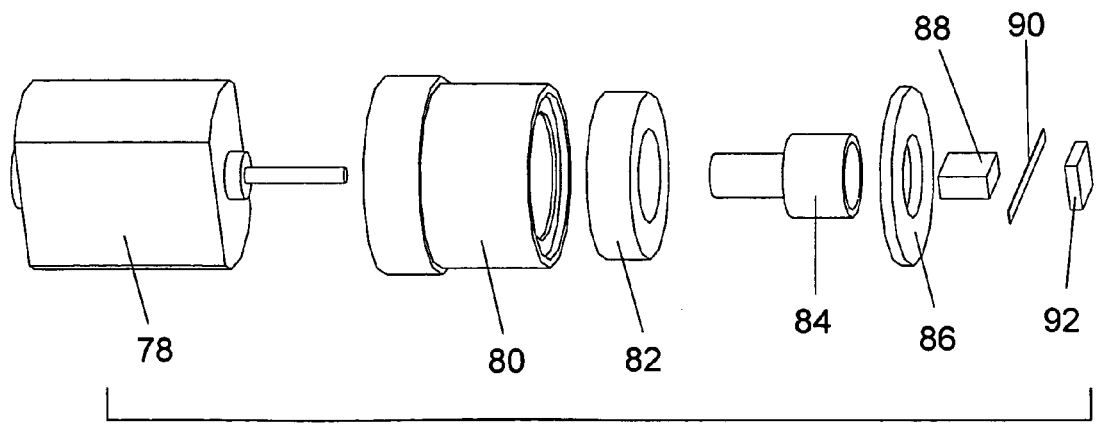
FIG. 6

MUSICAL LASER DISPLAY DEVICE

CROSS-REFERENCE TO RELATED APPLICATIONS

This application claims the benefit of U.S. Provisional Patent Application Ser. No. 60/698,158, filed Jul. 11, 2005, which application is hereby incorporated by reference.

FIELD OF THE INVENTION

The present invention relates to devices for producing entertaining visual patterns in synchronous relation with a variable input signal, such as music, and more particularly to a portable low cost laser show providing visual polar coordinate line patterns in response to music.

BACKGROUND OF THE INVENTION

A visual lighting effect device known as a laser show, projects a moving laser beam onto a viewing screen thereby creating graphic line images. Only one dot of light is projected at any instant of time. However, the dot moves at a rate that makes it appear as a continuous line. This effect is created by the human persistence of vision which acts much like the phosphorus coating in a cathode ray tube. Laser shows capable of producing complex sound responsive effects such as dancing figures or geometric patterns based on the frequency and amplitude data of music are costly and are not suitable for personal use. Low cost laser shows designed for personal use have been commercially successful. Most incorporate a sound responsive mode of operation, but the images produced become less entertaining over time because they are either redundant geometric patterns or random squiggly lines.

Low cost laser shows for home entertainment are cost constrained, heretofore limiting the image types to Spirographic or Lissajous in nature, or squiggly random lines. FIG. 1 shows images from conventional laser beam deflector devices. Images 13a-13h are from a group of low cost, sound responsive laser show devices. Random images, such as image 13a for example, are produced in relation to sound by vibrating one or more mirrors with an audio transducer such as a speaker or voice coil. Spirographic images, such as image 13b, are produced by devices rotating two or more mirrors using motors. Image patterns 13c-13h are examples of images created using various motor speeds. In the sound responsive mode of operation, these devices sequence through preset images in relation to the beat of music. Other sound responsive images may be produced by a rotating mirror galvanometer device. Image 13i shows four cycles of an audio frequency sinewave signal, and image 13j is of a complex audio waveform signal.

SUMMARY OF THE INVENTION

One aspect of the present invention involves, in one embodiment, a device for deflecting a light beam in response to an audio input signal. The device has a rotatable hub member, for rotation about an axis of rotation passing through said hub member, and a mirror flexibly attached to said hub member at an offset angle. The offset angle causes a light beam striking the mirror to be deflected angularly away from the axis of rotation of the rotatable hub member. A magnet is connected to the mirror. An electromagnetic coil is positioned adjacent the magnet for producing an electromagnetic field in relation to a received audio input signal when energized, thereby urging the magnet and the mirror to oscillate with respect to the offset angle in relation to the audio input signal. A low pass filter filters out audio input signal frequencies that would cause the mirror and the magnet to naturally resonate.

Another aspect of the present invention involves a method of setting a mirror offset angle in a device for deflecting a light beam in response to an audio input. The method includes the steps of providing a hub member surrounded by an electromagnetic coil, where the hub member is rotatable about an axis of rotation passing through the hub member, and positioning the hub member at a predetermined distance from a reflective surface, where the hub member's axis of rotation is substantially horizontally perpendicular to the reflective surface. The hub member's axis of rotation is also aligned with a predetermined point on the reflective surface. A mirror assembly having a mirror flexibly connected to a mounting ring and a magnet connected to said mirror is provided. The mounting ring has an inner opening sized to fit over an end of the hub member. The inner opening of the mounting ring is fit over an end of the hub member such that the magnet is adjacent the electromagnetic coil. The electromagnetic coil is energized with a 55 Hz sine wave input signal to produce an electromagnetic field, thereby causing said magnet to oscillate said mirror with respect to said hub member in relation to the input signal. A visible light beam is provided and positioned to strike the mirror so as to be deflect onto the reflective surface, where oscillation of the mirror creates a visible line of deflected light on the reflective surface. An end of the visible line of deflected light is aligned with the predetermined point on the reflective surface.

A further aspect of the present invention involves, in another embodiment, a device for deflecting a light beam in response to an audio input signal. The device includes a hub member, a mirror flexibly attached to the hub member, a magnet connected to the mirror, an electromagnetic coil, and a low pass filter. The electromagnetic coil is positioned adjacent the magnet for producing an electromagnetic field in relation to a received audio input signal when energized, thereby urging the magnet and the mirror to oscillate with respect to the hub member in relation to the audio input signal. The low pass filter filters out audio input signal frequencies that would cause the mirror and the magnet to naturally resonate.

The objects and advantages of the present invention will be more apparent from the following detailed description when taken in conjunction with the accompanying drawings.

BRIEF DESCRIPTION OF THE DRAWINGS

A complete understanding of the present invention may be obtained by reference to the accompanying drawings, when considered in conjunction with the subsequent, detailed description, in which:

FIG. 2b is a section view of the enclosure and end caps shown in FIG. 2a;

FIG. 3 is a rear detail view of the rear enclosure cap shown in FIG. 2a;

FIG. 4 is a front detail view of the front-enclosure cap shown in FIG. 2a;

FIG. 5 is a top perspective view of the printed circuit board assembly shown in FIG. 2b;

FIG. 6 is an exploded view of the spinning mirror galvanometer components shown in FIG. 5;

FIG. 10 shows exemplary images that may be created by the musical laser display device of FIG. 2a;

FIG. 11 is a block diagram of the electrical circuit of the musical laser display device of FIG. 2a; and FIG. 12 is a circuit schematic of the electrical circuit of the musical laser display device of FIG. 2a.

For purposes of clarity and brevity, like elements and components will bear the same designations and numbering throughout the Figures.

DETAILED DESCRIPTION OF A PREFERRED EMBODIMENT

Figure 1:
FIG. 1 is a detail view of image examples of the prior art.
Figure 1:
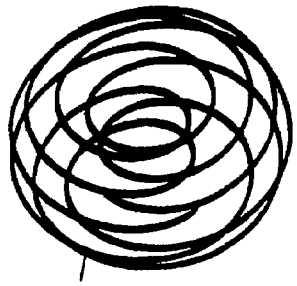
Figure 1:
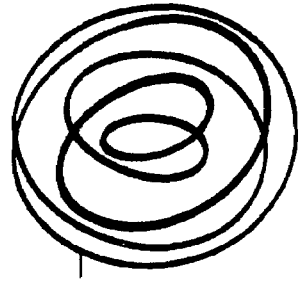
Figure 1:
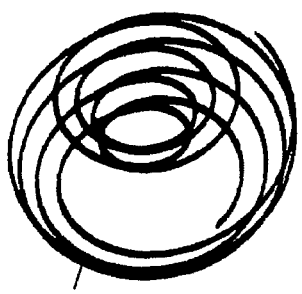
Figure 1:
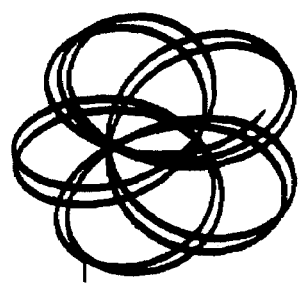
Figure 1:
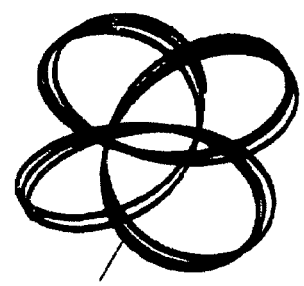
Figure 1:
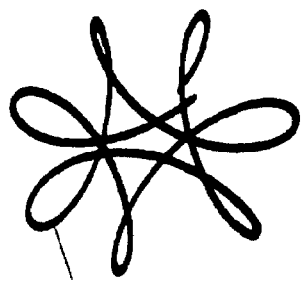
Figure 1:
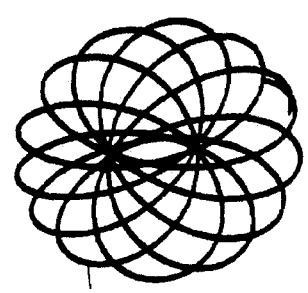
Figure 1:
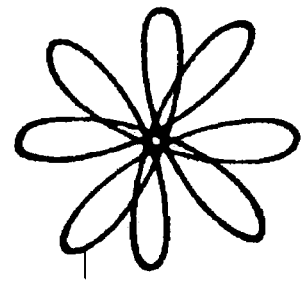
Figure 1:
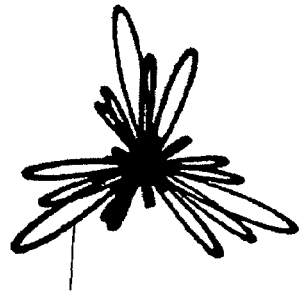

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

Figure 2A:
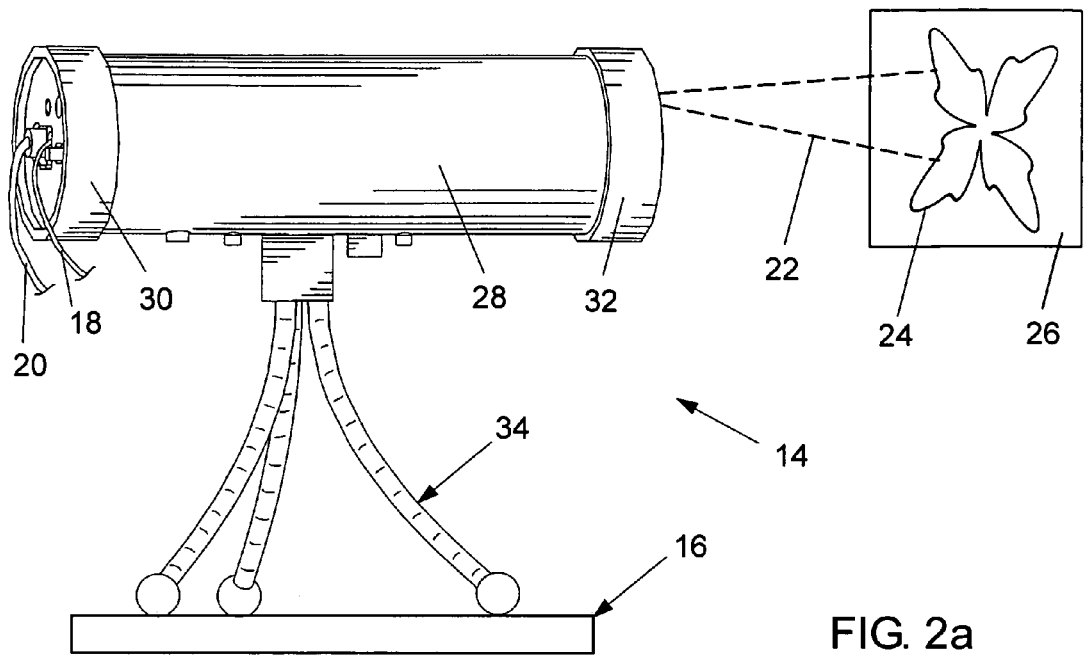
FIG. 2a is a perspective view of one embodiment of a musical laser display device according to the present invention.

Referring now to FIG. 2a of the drawings, there is shown an operating musical laser display device 14. A projected laser beam 22 is controlled so it traverses a path on a reflective surface 26. The human persistence of vision allows viewers to perceive a continuous line created from a single point of light rapidly moving across the reflective surface 26. As such, a polar coordinate image 24 is formed in direct relation to an input signal source 20, such as an audio line out from a stereo system. The diameter of projected image 24 increases approximately 75 mm per 1 meter of distance between musical laser display device 14 and reflective surface 26. Reflective surface 26 can be a wall, a ceiling, or other object, however a white flat surface works best. A standard U.L. approved 9 volt DC 100 mA wall transformer supplies operating power to the device. Any conventional DC power source 18 capable of supplying at least 100 MA at 9 volts can be used. A flexible leg tripod 34 provides a stable support platform on to a flat mounting surface 16 such as a table. The deformable legs of tripod 34, manufactured by Hengdian Movie & TV Equipment Co., LTD (part number AT010), also provides for positioning of the projected image 24. The enclosure 28 is a rigid clear extruded plastic tube having five in-line holes drilled along the bottom side for fastener 38, fastener 40, and fastener 44, tripod 34 mounting and speed control access 48. A printed sheet of paper cut to size can be inserted into the enclosure 28 tube proving for an outward appearance, not shown. Plastic injected molded front cap 32 and rear cap 30 provide end closures for enclosure 28.

Figure 2B:
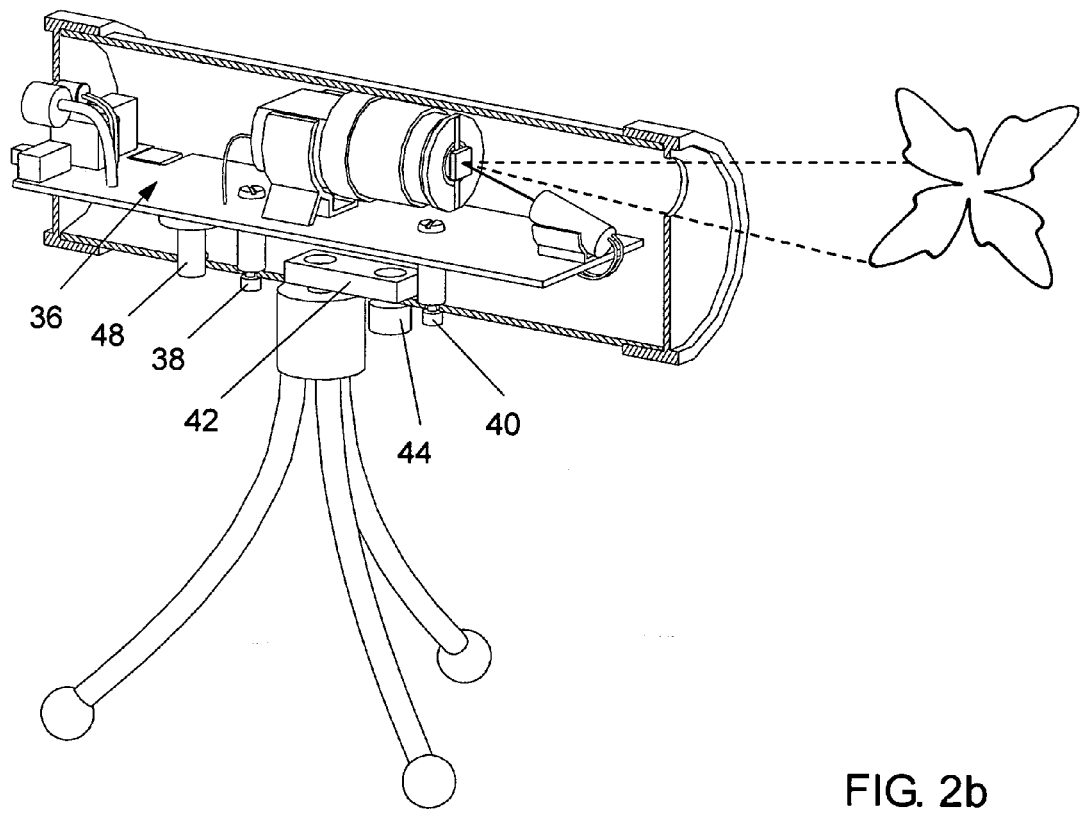

In FIG. 2b enclosure tube 28, front cap 32 and rear cap 30 are partially sectioned to reveal a circuit board sub-assembly 36 to which all internal components are mounted. Fasteners 38 and 40 are ASE 4-40 socket caps which hold circuit board sub-assembly 36 to enclosure 28. A screw plate 42 (Buckeye Fasteners T-plate TP-2112) has two female ASE ¼-20 threaded holes. One hole is used to hold the screw plate 42 to the enclosure 28 with fastener 44, an ASE ¼-20 socket cap screw. Tripod 34 threads into the second hole of screw plate 42. In FIG. 3, a detail view of rear cap 30 shows access holes for a line-in jack 50, a power jack 52, a power indicator 56, a microphone 58, and a power switch 54. In FIG. 4, a detail of front cap 32 shows a laser beam exit hole 60.

Circuit board sub-assembly 36 of FIG. 5 shows a conventional 1.57 mm thick, single-sided copper foil, FR4 fiberglass printed circuit board 62, which provides for a component mounting substrate and printed foil electrical component connections. The bottom side has surface mount electronic components mounted and the top side has through hole electrical, mechanical and optical components mounted. Line-in jack 50 is a conventional RCA audio-type connector allowing connection to an input signal source 20, such as a music stereo. A conventional 2.1 mm-type power jack 52 provides DC power source 18 electrical connection. Power switch 54, manufactured by E-switch (part number EG1206), is used to switch power on or off. Power indicator 56 is a conventional visible light LED that is illumined when circuit power is applied through power switch 54. A speed control potentiometer 48, manufactured by CTS (part number 201UH254B), provides manual speed control of a rotating mirror galvanometer 74 (hereinafter "galvo"). A motor mounting clip 64, manufactured by Richco Plastics (part number V-1009), is mechanically fastened to printed circuit board 62 with an ASE 4-40 screw and No. 4 nut holding galvo 74 in place relative to laser beam module 68 and exit hole 60. Laser module 68, manufactured by Eubon Technologies Co., LTD (part number LM-01), emits a collimated beam of 650 NM wavelength light having less than 5 mW of optical output power. Laser module 68 is held in place using a laser module mounting clip 66, manufactured by Richco Plastic (part number V-1001), and is mechanically fastened to printed circuit board 62 with an ASE 2-256 screw and ASE No. 2 nut. The laser module is position with respect to galvo 74 such that a light beam emitted from the module is deflected through exit hole 60 of front cap 32. Standoffs 70 and 72, manufactured by Keystone (part number 3480), are fasten to the printed circuit board 62 using ASE 4-40 screws.

Shown in FIG. 6 are the galvo components including: a motor 78, such as a Johnson Electric W1DC07A; a plastic mounting structure 80; an electromagnetic coil 82 having 250 turns of No. 31 AWG enamel coated magnet wire wound on a solenoid coil-form, manufactured by Cosmo Corporation (part number 2-05963); a plastic hub member 84; a plastic mounting ring 86; a mirror 92, fabricated from conventional 1.57 mm thick first surface mirrored glass cut to 5 mm square; a torsion rod 90, made from 0.127 mm thick SAE1095 spring steel electrochemically machined to 1.77 mm inch wide by 25 mm inch long, and; a NdFeB permanent magnet 88, manufactured by Amazing Magnets (part number Q063B). It will be appreciated that the lead wires of motor 78 and coil 82 and the individual windings of coil 82 are not shown for the sake of clarity.

Figure 7:
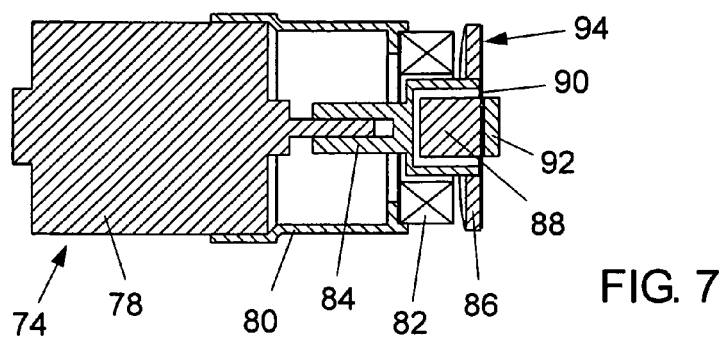
FIG. 7 is a side cross-sectional view of the spinning mirror galvanometer shown in FIG. 5.

In FIG. 7 a side cross section of galvo 74 is shown. Mounting structure 80 friction-fits over motor 78 and has inward diameter flats (not shown) to align the motor 78 with coil 82. Cyanoacrylate (hereinafter "glue") is used to hold the coil 82, mounting structure 80, and motor 78 together. The non-mirrored side of mirror 92 is attached in the middle of torsion rod 90 with glue. Magnet 88 is attached to the opposite side of torsion rod 90 with glue having its North and South magnetic poles positioned perpendicular to the torsion rod's longitudinal axis. Both ends of torsion rod 90 are glued to ring 86, having mirror 92 centered over the middle of the opening in mounting ring 86. Mounting ring 86, torsion rod 90, magnet 88, and mirror 92 form a mirror assembly (hereinafter "mirror assembly 94") that is glued to hub 84 after an alignment process described hereinafter. Hub 84 friction-fits to the motor shaft of motor 78 and spins freely inside stationary coil 82 without interference.

Figures 8A, 8B, 8C:
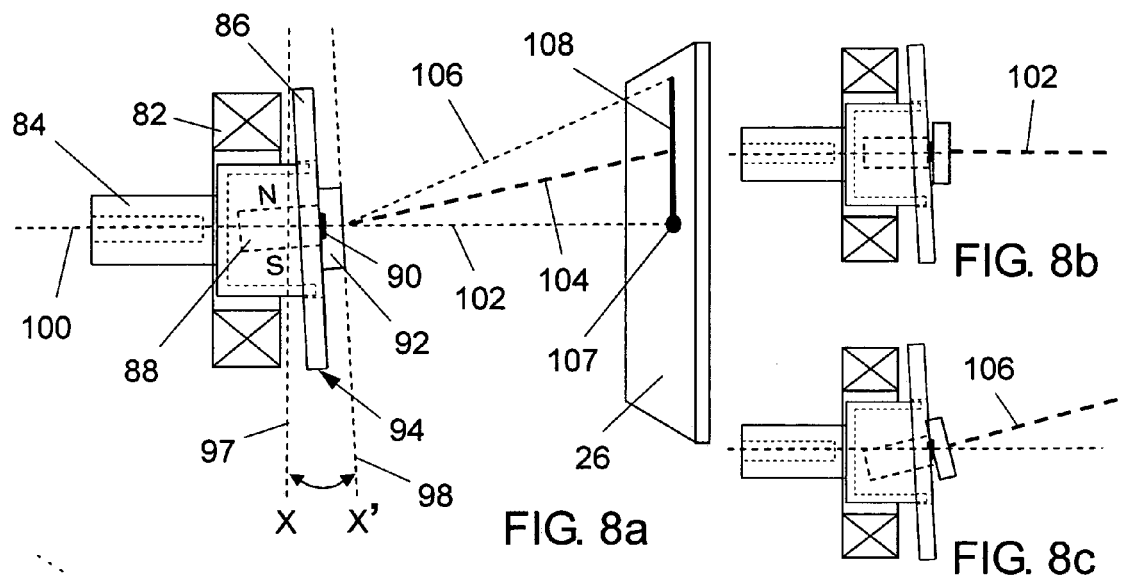
FIG. 8a is an over-head diagram of the mirror assembly alignment shown in FIG. 7.
FIG. 8b is an over-head diagram of an exemplary mirror deflection angle.
FIG. 8c is an over-head diagram of another exemplary mirror deflection angle.

One aspect of this invention involves the alignment of the reflective surface of mirror 92 in relation to the motor shaft rotational axis 100. FIGS. 8a-8c show over-head view diagrams of how mirror 92 deflects laser beam 109 in relation to an audio input signal, and how mounting ring 86 and hub 84 align mirror 92. The coil 82 is cross-sectioned and the laser module 68 and laser beam 109 are not shown for the sake of clarity. Reflective surface 26 in FIG. 8a is tilted back slightly for clarity.

Figure 9:
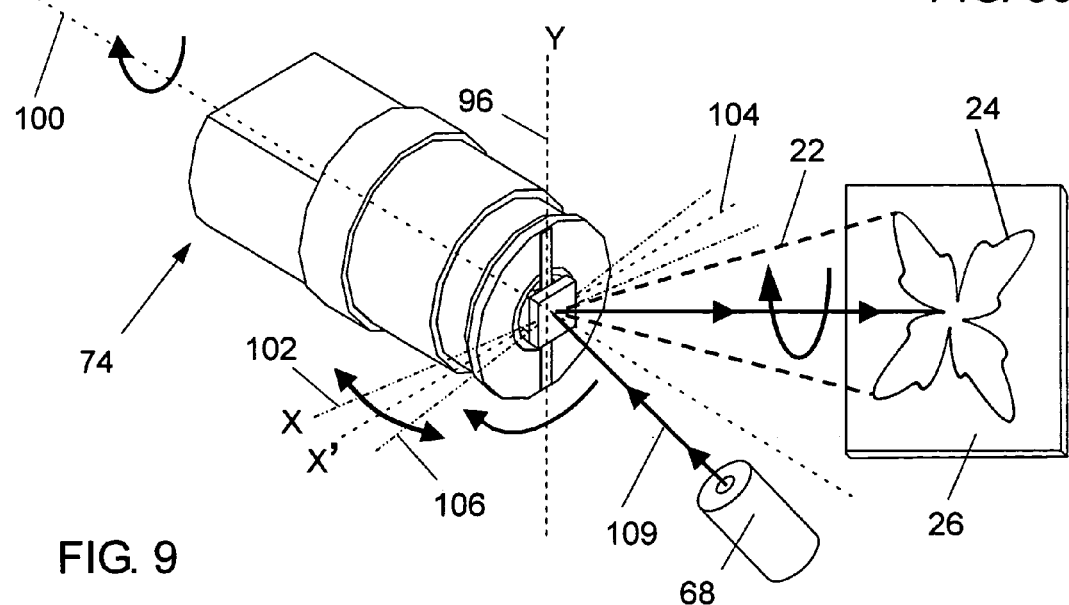
FIG. 9 is a perspective view of the spinning mirror galvanometer of FIG. 5.

The vertical plane of the mirror's reflective surface, marked in FIG. 9 with line Y 96, is preferably perpendicularly aligned with the rotational axis 100 of the motor shaft. A reference line that is horizontally perpendicular to the motor shaft rotational axis 100, marked as line X 97 in FIG. 8a, has been included to clearly illustrate that the horizontal plane of the mirror's reflective surface, marked with line X' 98 in FIG. 8a, is initially angularly offset from horizontally perpendicular reference line X 97, creating an initial offset angle (hereinafter "offset angle 104").

Torsion rod 90 holds magnet 88, and mirror 92 stable in the mirror's vertical plane, while allowing the magnet 88 and mirror 92 to oscillate in the mirror's horizontal plane with zero backlash when electric current is applied to coil 82. Mirror 92 is urged to move from offset angle 104 by magnet 88 when coil 82 is energized to create an electromagnetic field within hub member 84 that selectively repels magnet 88. This cause magnet 88 to move horizontally from side-to-side, depending upon the audio input signal received, and thereby causes mirror 92 to move in relation to the audio input signal received. Torsion rod 90 also provides a restorative force to magnet 88 and mirror 92. Coil 82 is energized with varying positive and negative currents from power amplifier 126 (shown in FIGS. 11 and 12) in direct relation to input signal polarity and amplitude. When the input signal is equal to zero, no current flows through coil 82, and the restorative force of torsion rod 90 returns magnet 88 and mirror 92 to offset angle 104. The minimum mirror angle 102 (FIGS. 8a, 8b and 9) occurs during maximum negative coil current. This is the center, or polar coordinate pole position of image 24, and is also equal to the motor shaft rotational axis 100. The maximum mirror angle 106 (FIGS. 8a, 8c and 9) occurs during maximum positive coil current thus creating the maximum image 24 diameter.

It can be appreciated that component tolerances and assembly processes add unique variations to each galvo assembly. This is particularly true when using low cost components in which the maximum image 24 radius is subject to variables such as the magnetic field strength of coil 82, strength of magnet 88, and the shear strength of torsion rod 90. Variations also add small deviations to the relative angle of mirror 92 with respect to the motor axis of rotation 100 producing unwanted results in the image 24, therefore a mirror alignment process compensates for all these variations. The outside diameter of hub 84 and the inner opening of mounting ring 86 are sized to frictionally fit together so that mirror assembly 94 may be aligned by the following method.

The printed circuit board sub-assembly 36 is held in a known position at a distance of 2 meters from a 1 meter square reflective surface 26 having a 2 mm black dot 107 (FIG. 8a). The motor shaft rotational axis is positioned perpendicular to the reflective surface and is aligned with the center of the black dot 107. With motor power disconnected, mirror assembly 94 is placed on to hub 84 with mirror 92 facing opposite motor 78. With coil 82 connected to the circuit of FIG. 12, a maximum level 55 Hz sine wave input signal is applied to line-in jack 50. Power is connected to power jack 52 and switched "on" using power switch 54. Mirror 92 begins oscillating between minimum mirror angle 102 and maximum mirror angle 106 at a 55 Hz rate thus deflecting the projected visible laser beam 22 back and forth on the reflective surface 26. Since motor 78 is not rotating, a visual line of the beam trajectory 108 (FIG. 8a) is projected on the reflective surface 26. Mirror assembly 94 is positioned so an end of the beam trajectory 108 touches the black dot 107 during the peak negative input signal. Power is then switched to "off." Glue is then applied between mirror assembly 94 and hub 84, rigidly bonding them together. Using this method, the deflected laser beam 22 angle is equal to the offset angle 104 being approximately one half of the maximum image 24 radius when the audio input signal equals zero.

Figure 10:
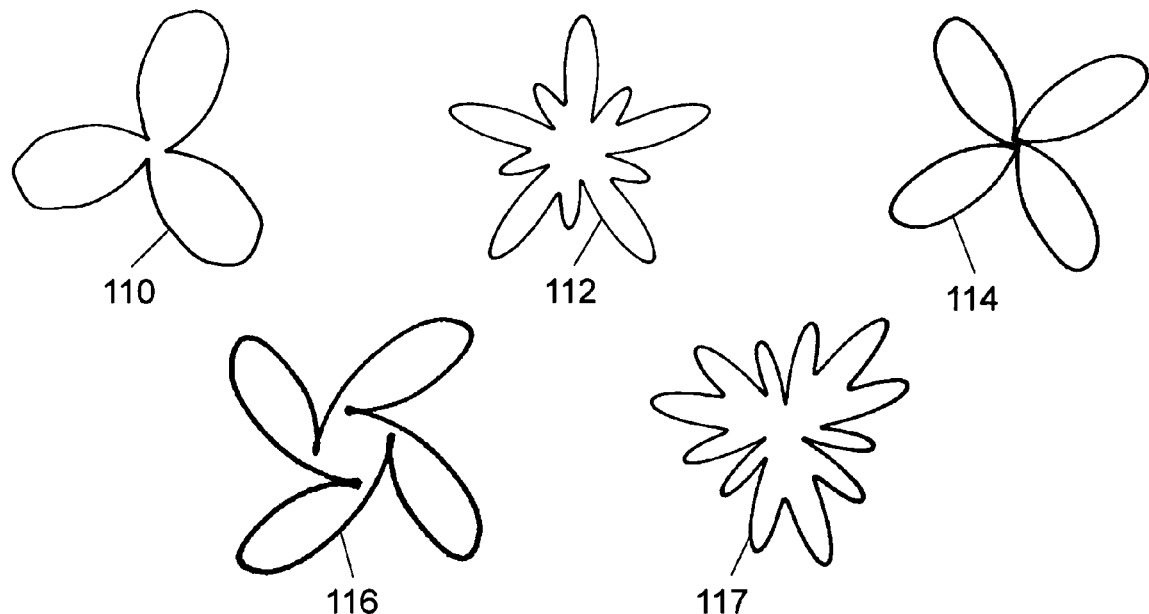

FIG. 10 shows examples of images that may be produced by an operating musical laser display device 14. Various constant amplitude sinusoidal signals are applied to input signal jack 50, with motor 78 rotating at a constant 1200 revolutions per minute. Example image 110 is produced with a 55 Hz sine wave input signal. Example image 112 is a combination of 91 Hz and 182 Hz. Example image 114 is 73 Hz. Example image 116 is 73 Hz with the Y axis of the mirror misaligned, thus illustrating that an improved image is created when the Y axis of mirror 92 is aligned as set forth above. Example image 117 combines 55 Hz and 220 Hz.

Figure 11:
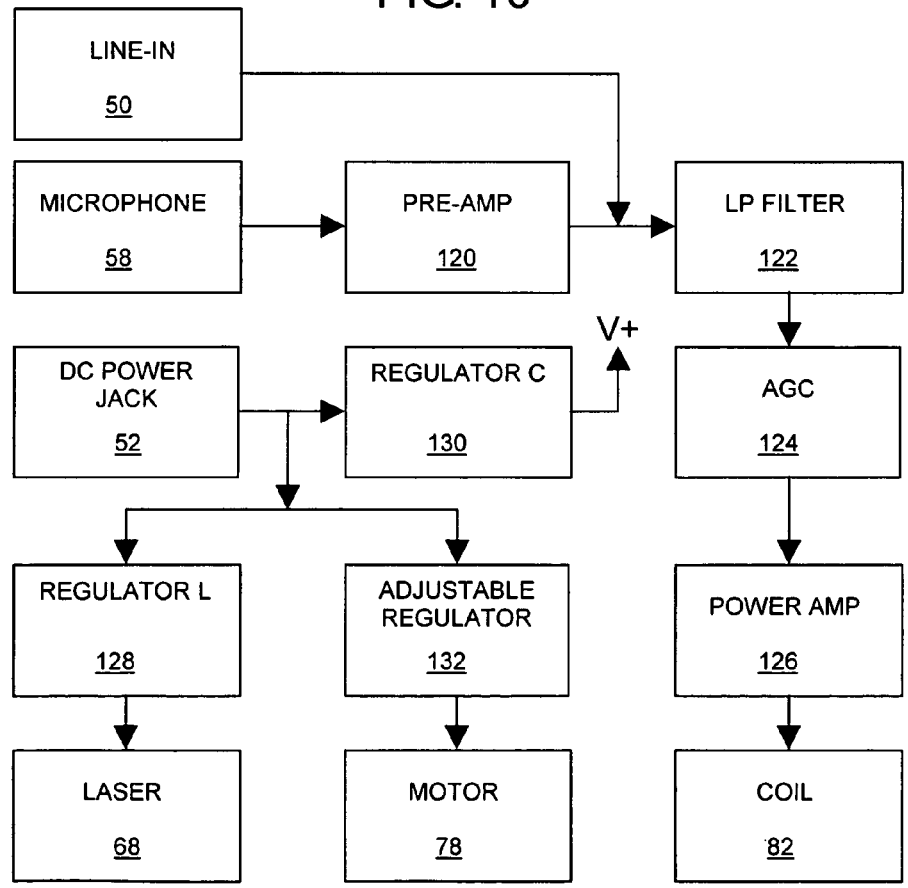

In FIG. 11 the electrical signal path and functional circuit block diagram is shown. An input signal enters the circuit through line-in jack 50 or microphone 58. The low level signal of the microphone 58 is amplified using a preamplifier 120. A low pass (LP) filter 122 with a cutoff frequency of 800 Hz blocks input signal frequencies equal to and above the self resonance frequency of mirror assembly 94, preventing excessive oscillations which distort projected image 24. An automatic gain control (AGC) circuit 124 controls input signal level to a power amplifier 126 maintaining image 24 quality over an 80 dB input signal range. A power amplifier 126 buffers the conditioned input signal sufficiently to drive coil 82. DC power enters through DC power jack 52. Regulator 130 provides a constant voltage to power amp 126, AGC circuit 124, LP filter 122, pre-amp 120, and microphone 58. Regulator 128 provides a constant voltage to laser 68. Adjustable regulator 132 may be manually adjusted to vary the voltage sent to motor 78, allowing a user of the device 14 to control the rotation speed of the motor.

Figure 12:
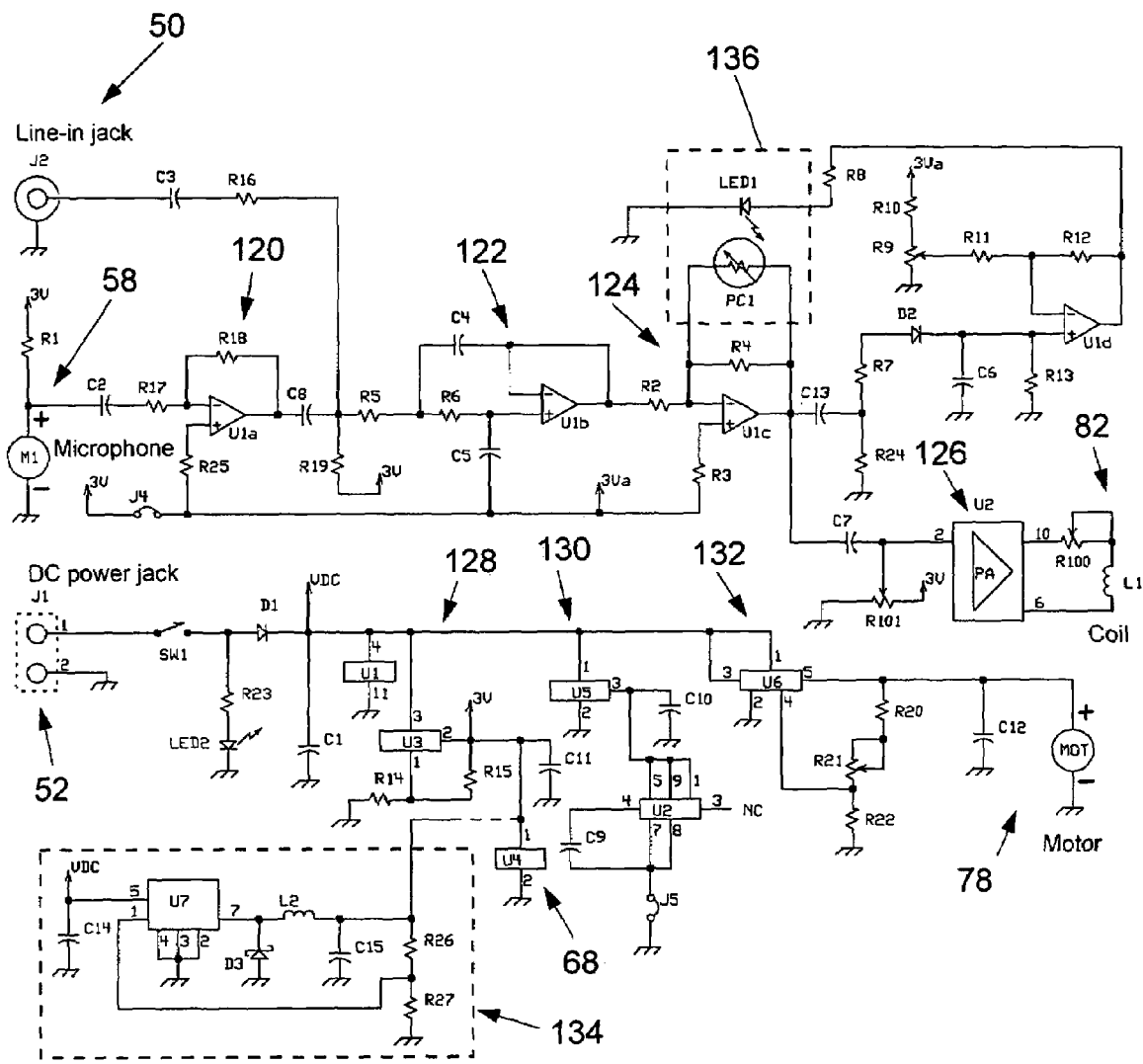

In FIG. 12 the electrical circuit schematic is shown. An input signal enters through connector J2 and is AC coupled through C3 (0.47 uF) then divided through R16 (10K ohms) and R19 (100K ohms) relative to 3 volts. Ambient sounds are converted to a small electrical signal with a buffered microphone 58 M1 (Panasonic WM-54BT) powered from 3 volts through R1 (2.2K ohms). A capacitor C2 (0.47 uF) provides AC coupling to inverting amplifier U1a (LM324) with the gain set by the ratio of R17 (10K ohms) and R18 (470K ohms) and with R25 (10K ohms) biasing the non-inverting input. Capacitor C8 (0.47 uF) AC couples the buffered microphone 58 signal that is summed with the line-in signal to the LP filter 122 made from U1b (LM324), R5 (2.2K ohms), R6 (22K ohms), C4 (1 uF) and C5 (0.22 uF). LP filter 122 output supplies an input signal to AGC (automatic gain control 124) comprised of inverting amplifier U1c (LM324) having its gain set by the ratio of R2 (10K ohms) and R4 (1 meg ohms) and photocell PC1 resistance (Advanced Photonix, Inc. PDV-9008). Resistor R4 sets a maximum gain level and R3 (10K ohms) provide bias to the non-inverting input. U1c (LM324) output signal is AC coupled through C13 (0.1 uF) then attenuated by R24 (10K ohms). R7 (10K ohms) sets the AGC attack rate. D2 (1N4148) and C6 (10 uF) provide an envelope follower. R13 (470K ohms) discharges C6 when D2 is not forward biased and sets AGC decay rate. The voltage across C6 represents the input signal level appearing at the power amplifier 126 input. U1d (LM324) is the AGC error amplifier with its gain set by the ratio of R11 (10K ohms) and R12 (100K ohms). R9 (MuRata PV3A103A01R00) and R11 (51K ohms) provide an adjustable AGC level set point. The output level of U1d, is current limited through R8 (475 ohms), and varies the light intensity of LED1 (QT Optoelectronics LTST-S220GKT) which illuminates photocell PC1 varying its resistance which in turn varies the gain of U1c. Light shield 136 (5 mm×15 mm diameter black heat shrink tubing) surrounds PC1 and LED1 and prevents ambient light from effecting PC1. C7 (0.47 uF) couples the output signal from AGC to the input of power amplifier 126 U2 (National Semiconductor LM4667MM). Optional R100 (1 Meg ohm potentiometer) sets a constant positive or negative offset bias to U2 which changes the offset angle 104. Additional power supply current is required when using R101 therefore it is left out of the circuit.

Optional potentiometer R100 (100 ohm) provides an adjustable power limit to L1 coil 82. Power for the musical laser display device 14 enters DC power jack 52 J1. SW1 switches power on or off to the circuits. R23 (2.2K ohms) limits the current to LED2 (T1-3/4 red LED) provides a visual indication of applied power. D1 (DL4004) protects the circuits from accidental power supply reversal and C1 (100 uF) filters in coming power supply ripple to U1, U3 (LM117-ADJ), U5 (LM2937-5) and U6 (LP2980-ADJ). U3 voltage regulator L 128 output voltage is set by R14 (649 ohms) and R15 (475 ohms) then filtered by C11 (10 uF) before supplying power to the laser U4. When using a higher power laser diode module it is necessary to remove U3 and R15 and connect the optional high power regulator 134 to power U4. U7 (LM2574-ADJ) is a switch mode buck voltage regulator having an input filter C14 (10 uF), catch diode D3 (ON Semiconductor MUR110), inductor L2 (330 uH), output filter C15 (10 uF) with the output voltage being set with R26 (6120 ohms) and R27 (2K ohms). U5 regulates the voltage to U2. U6 is an adjustable voltage regulator 132 used to vary motor 78 speed. Its output voltage is set with R21 (250K potentiometer) and R20 (51K ohms) and R22 (51K ohms) limit the minimum and maximum output voltage. While a closed loop motor speed control could be used, an open loop control was chosen because the motor is lightly loaded and the load does not vary.

The musical laser display device 14 is used by first positioning the device so that the laser image projected by the device will be projected onto a suitable reflective surface 26, as shown in FIG. 2a. DC power is connected to power jack 52 and power switch 54 is placed in the "on" position. A signal source 20, such as music, is supplied to the line-in jack 50 or microphone 58. Motor speed is manually adjusted to the viewers discretion, preferably between 0 and 2000 RPM, or can be calibrated using a 55 Hz input signal and setting the motor speed to obtain a steady non-rotating image having 2, 3, 4 or 5 projected petals, with 3 (example image 110) being the most desirable (motor speed of 1200 RPM). More visually entertaining images are created when using this calibration, because 55 Hz is three octaves down from a standard musical instrument tuning system where a musical note named A is equal to 440 Hz. To further manually affect the size of the projected image 24, an external permanent magnet (not shown), such as those manufactured by Amazing Magnets (part number R1000D), can be moved by hand in proximity to coil 82 through enclosure 28.

While the invention has been described in detail with reference to the specific embodiments thereof, it would be apparent to those skilled in the art that various changes and modifications may be made therein without departing from the spirit of the invention. For example, it will be understood that the specific construction and operation of the electronic circuit may take on a variety of different forms known to those skilled in the art, whereby the specific circuit components have been described herein in functional terms only. Accordingly, no limitation on the invention is intended by way of the foregoing description and the accompanying drawings, except as set forth in the appended claims.

What is claimed is:

1. A device for deflecting a light beam in response to an audio input signal, comprising:
    a rotatable hub member for rotation about an axis of rotation passing through said hub member;
    a mirror flexibly attached to said hub member at an offset angle, said offset angle causing a light beam striking said mirror to be deflected angularly away from said axis of rotation of said rotatable hub member;
    a magnet connected to said mirror;
    an electromagnetic coil positioned adjacent said magnet for producing an electromagnetic field in relation to a received audio input signal when energized, thereby urging said magnet and said mirror to oscillate with respect to said offset angle in relation to the audio input signal; and
    a low pass filter for filtering out audio input signal frequencies that would cause said mirror and said magnet to naturally resonate.

2. The device of claim 1, further comprising an automatic gain control circuit for conditioning the audio input signal.

3. The device of claim 2, further comprising:
    a motor for rotating said rotatable hub; and
    an adjustable regulator for controlling voltage applied to said motor.

4. A method of setting a mirror offset angle in a device for deflecting a light beam in response to an audio input, comprising:
    providing a hub member surrounded by an electromagnetic coil, said hub member rotatable about an axis of rotation passing through said hub member;
    positioning said hub member at a predetermined distance from a reflective surface, where said hub member's axis of rotation is substantially horizontally perpendicular to said reflective surface;
    aligning said hub member's axis of rotation with a predetermined point on the reflective surface;
    providing a mirror assembly having a mirror flexibly connected to a mounting ring and a magnet connected to said mirror, said mounting ring having an inner opening sized to fit over an end of said hub member;

fitting said mounting ring's inner opening over an end of said hub member such that said magnet is adjacent said electromagnetic coil;

energizing said electromagnetic coil with a 55 Hz sine wave input signal to produce an electromagnetic field, thereby causing said magnet to oscillate said mirror with respect to said hub member in relation to the input signal;

providing a visible light beam;

positioning said visible light beam to strike said mirror so as to be deflect onto said reflective surface, oscillation of said mirror creating a visible line of deflected light on the reflective surface; and aligning an end of said visible line of deflected light with said predetermined point on the reflective surface.

5. The method of claim 4, further comprising fixing position of said mounting ring with respect to said hub member.

6. A device for deflecting a light beam in response to an audio input signal, comprising:

a hub member;

a mirror flexibly attached to said hub member;

a magnet connected to said mirror;

an electromagnetic coil positioned adjacent said magnet for producing an electromagnetic field in relation to a received audio input signal when energized, thereby urging said magnet and said mirror to oscillate with respect to said hub member in relation to the audio input signal; and a low pass filter for filtering out audio input signal frequencies that would cause said mirror and said magnet to naturally resonate.

7. The device of claim 6, further comprising an automatic gain control circuit for conditioning the audio input signal.

8. The device of claim 6, further comprising:

a motor for rotating said rotatable hub; and an adjustable regulator for controlling voltage applied to said motor.

* * * * *